United States Patent
Pepin et al.

(10) Patent No.: US 8,690,067 B2
(45) Date of Patent: Apr. 8, 2014

(54) SMART CARD COMPRISING AN ELECTRONIC MODULE SUPPORTED ON A CARD BODY PROVIDED WITH A MEANS FOR AUTHENTICATING THE PEERING OF THE MODULE WITH THE BODY

(75) Inventors: Cyrille Pepin, Andresy (FR); Sylvie Pompeani, Paris (FR)

(73) Assignee: Morpho (FR)

( * ) Notice: Subject to any disclaimer, the term of this patent is extended or adjusted under 35 U.S.C. 154(b) by 0 days.

(21) Appl. No.: 13/126,960

(22) PCT Filed: Nov. 23, 2009

(86) PCT No.: PCT/FR2009/001336
§ 371 (c)(1),
(2), (4) Date: Apr. 29, 2011

(87) PCT Pub. No.: WO2010/061073
PCT Pub. Date: Jun. 3, 2010

(65) Prior Publication Data
US 2011/0210177 A1    Sep. 1, 2011

(30) Foreign Application Priority Data
Nov. 28, 2008  (FR) ...................................... 08 06694

(51) Int. Cl.
*G06K 19/06*    (2006.01)

(52) U.S. Cl.
USPC ............................................ 235/492; 235/487

(58) Field of Classification Search
USPC ................... 235/375, 380, 487, 492
See application file for complete search history.

(56) References Cited

U.S. PATENT DOCUMENTS

| 4,370,550 A | | 1/1983 | Sidline |
| 5,519,201 A | * | 5/1996 | Templeton et al. ............ 235/492 |
| 6,092,729 A | * | 7/2000 | Seo ........................... 235/462.09 |

FOREIGN PATENT DOCUMENTS

| FR | 2695234 A1 | 3/1994 |
| FR | 2859870 A1 | 3/2005 |
| WO | WO-02/33652 A1 | 4/2002 |

* cited by examiner

*Primary Examiner* — Karl D Frech
(74) *Attorney, Agent, or Firm* — Muncy, Geissler, Olds & Lowe, P.C.

(57) ABSTRACT

A smart card has an electronic module and a card body carrying the module. The smart card includes a card body provided with a cavity and an electronic module having at least one portion presenting thickness that is less than the thickness of the card body. The electronic module is housed in the cavity and is secured to the card body. At least one through hole passes in succession through the portion of the module that presents a thickness that is less than the thickness of the card body, and through the card body.

5 Claims, 3 Drawing Sheets

SMART CARD COMPRISING AN ELECTRONIC MODULE SUPPORTED ON A CARD BODY PROVIDED WITH A MEANS FOR AUTHENTICATING THE PEERING OF THE MODULE WITH THE BODY

The invention relates to a smart card comprising a card body of plane shape carrying an electronic module.

BACKGROUND OF THE INVENTION

In general, a smart card comprises a card body in the form of a plane card of plastics material having a rectangular outline, together with an electronic module carried by the body, the module comprising a processor associated with memory means, together with electrical contacts that are flush with one of the faces of the card body.

Such a card is used in particular in applications that require a high level of security, such as for example applications of the bank payment card type. Such a card may also be used for constituting an identity badge, a transport ticket, etc., likewise implying a high degree of security.

Various pieces of information are then printed on each face of the card body, this information generally including a hologram, a card number, etc. Furthermore, the data stored in the electronic module is protected by various digital encryption techniques.

One known fraud consists in devising a pirate electronic module and in fastening it to a card body that has been used but that is authentic, so as to have a fraudulent bank card having the external appearance of a normal bank card. The fraudster can then hand the card over to a trader in order to make a payment, and the trader has no way of detecting that the electronic module carried by the card body is in fact a pirate module.

Under such circumstances, the fraudster can make payments without being troubled by the traders to whom the card is shown or given in order to make those payments.

Another fraud consists in using an authentic module with a card body that is fraudulent. The card body then carries the name of the pirate, but the chip in fact belongs to a bank card belonging to some other person, thus enabling the pirate to make purchases that are debited to the account of that other person.

OBJECT OF THE INVENTION

The object of the invention is to propose a solution for remedying that drawback.

SUMMARY OF THE INVENTION

To this end, the invention provides a smart card comprising a card body having a cavity and an electronic module having at least one portion presenting thickness that is less than the thickness of the card body, the electronic module being housed in the cavity and being secured to the card body, wherein the smart card includes at least one through hole that includes a portion passing through the portion of the module that presents a thickness that is less than the thickness of the card body, and a portion that passes through the card body.

With this solution, it is difficult for a fraudster to make the holes in a used card body coincide with the holes in a pirate module. Each hole that passes light thus guarantees the authenticity of the association between the electronic module and the card body, and this authenticity can be verified merely by visual inspection.

The invention also provides a smart card as defined above, wherein the module includes an electrical contact area and a unit including a processor associated with memory means, said unit being fitted to a central region of one of the faces of the electrical contact area, and wherein each through hole passes through a portion of the module corresponding to a peripheral region of the electrical contact area.

The invention also provides a smart card as defined above, including a plurality of holes together defining one or more patterns.

The invention also provides a smart card as defined above, including a first series of patterns relating to the manufacturer of the smart card and/or a second series of patterns specific to the particular smart card.

The invention also provides a smart card as defined above, wherein each hole has a flared shape presenting a section of dimensions that increases from one end of the hole to the other.

The invention also provides a smart card as defined above, including at least one flared hole of smaller-dimension section situated in a first face of the card, and at least one other flared hole having its smaller-dimension section situated in a second face of the card, said second face being opposite from the first face.

The invention also provides a smart card as defined above, wherein each hole is made by laser perforation.

DETAILED DESCRIPTION OF THE INVENTION

Figure 1:
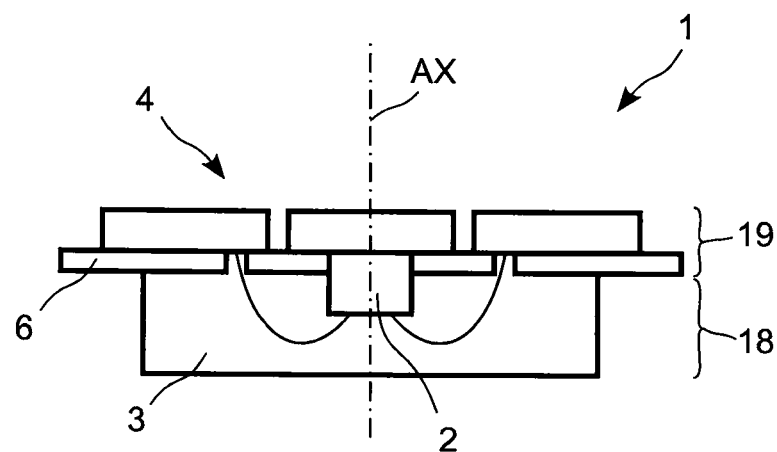
FIG. 1 is a side view in section of an electronic module for a smart card.

As can be seen in FIG. 1, the electronic module 1 that constitutes the chip of a smart card comprises a unit 2 including in particular a processor and memory means embedded in protective means 3, together with an electrical contact area 4 including a support film 6. The unit 2 is fitted to a central region of one of the faces of the contact area 4, and it is electrically connected to the contacts of the contact area 4.

Figure 2:
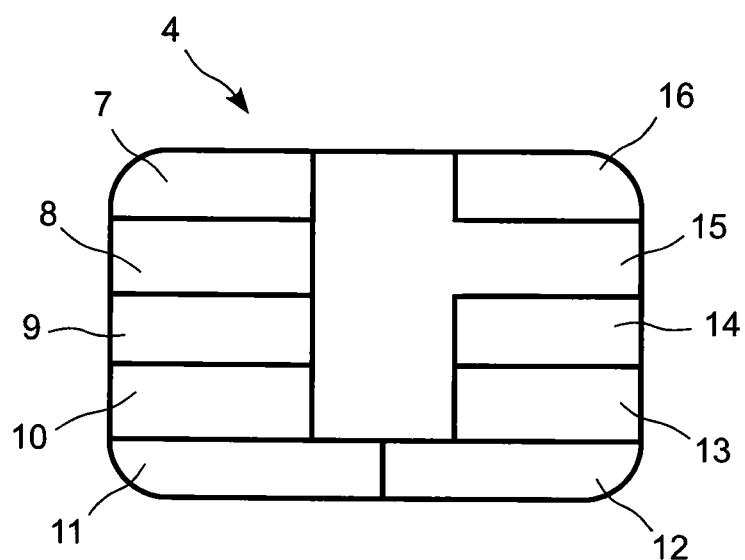
FIG. 2 is a plan view of an electrical contact area of an electronic module for a smart card.
Figure 3:
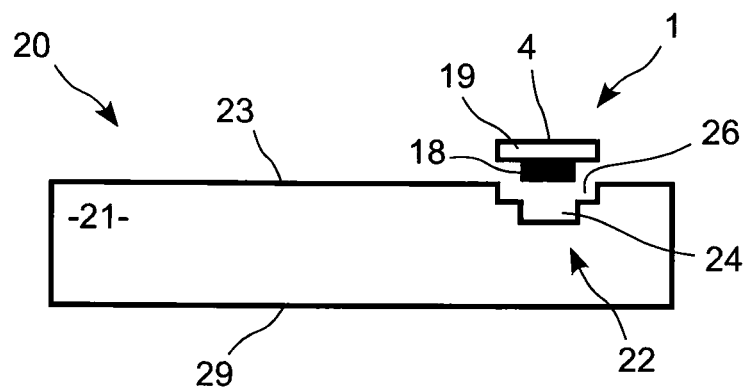
FIG. 3 is a side view in section showing a smart card body and an electronic module before assembly.

As can be seen in FIG. 2, the contact area 4 has a rectangular outline with rounded corners and comprises two series of ten contacts or keys that are referenced 7 to 16. These are contiguous and coplanar and each of them is in the form of a metal plate, with these contacts or keys being carried by the support film 6.

In the example of FIG. 2, the keys 7 to 10 and 13 to 16 are electrical contacts, whereas the keys 11 and 12 are not electrical contacts proper, insofar as they are not connected. The invention also applies equally well to a chip having an area with eight keys, as defined by the standard ISO 7816-2.

The protective means 3 and the unit 2 are situated in a "bottom" portion 18 of the module 1, whereas the contact area 4 and its support film 6 are situated in a "top" portion 19 that is superposed on the bottom portion 18.

As shown in FIGS. 1 and 2, the top portion 19 is of larger dimensions than the bottom portion 18 when these portions are looked at along an axis AX that is normal to the plane of the contact area 4.

Figure 4:
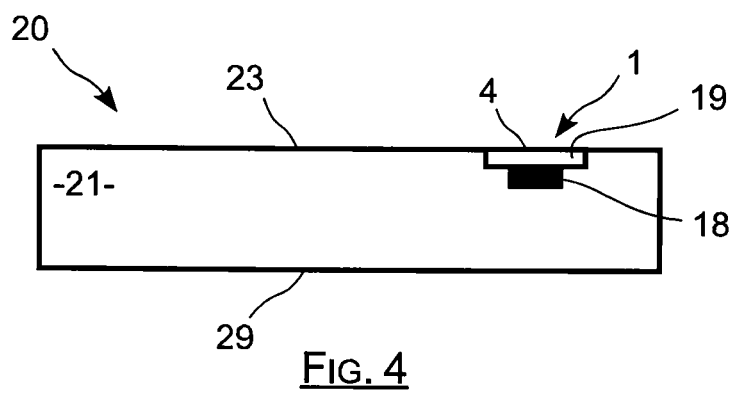
FIG. 4 is a side view in section showing a card body and an electronic module assembled together.

Concerning their thicknesses, as measured along the axis AX, the thickness of the top portion 19 is less than the thickness of the bottom portion 18, with the thickness of the module 1 as a whole being less than the thickness of the card body 21 in which the module 1 is to be fastened, as can be seen in particular for the smart card 20 that is shown after assembly in FIG. 4.

The card body 21 typically comprises five layers that are superposed on one another, comprising a core layer, two printable layers situated on either side of the core layer, and two protective layers that are situated respectively on either side of the printable layers. The card body could equally well have some other number of layers.

The module 1 is housed in a cavity 22 formed in one of the faces of the card body 21, here the top face 23, the module 1 being fastened to the card body 21, e.g. by adhesive. This cavity 22 in this example is not a through hole and comprises a top portion 26 that is extended by a bottom portion 24 of smaller section.

The top portion 26 is made for example by providing an opening in the top protective layer of the card, whereas the bottom portion 24 is made for example by milling.

The top portion 26 of the cavity 22 has the same dimensions as the top portion 19 of the module 1, and the bottom portion 24 of the cavity 22 has the same dimensions as the bottom portion 18 of the module 1.

Once in place, and as shown in FIG. 4, the module 1 is thus received in the cavity 22 by being engaged therein, with the contact area 4 then being situated flush with the top face 23 of the card body 21, extending parallel thereto.

Figure 5:
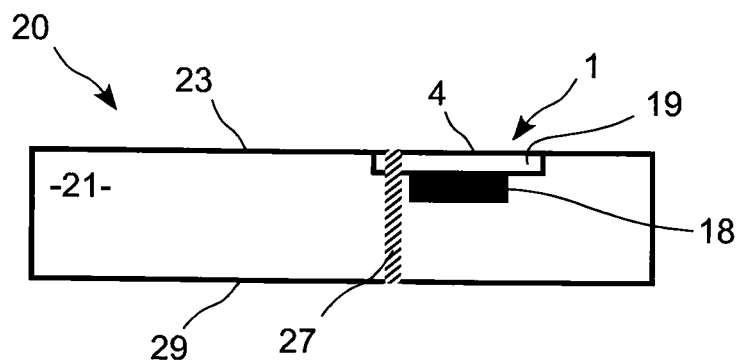
FIG. 5 is a side view in section showing a card body and an electronic module assembled together after a through hole has been made.
Figure 6:
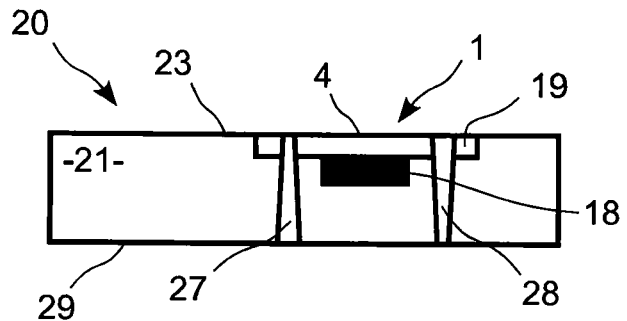
FIG. 6 is a side view in section showing a card body and an electronic module assembled together after two through holes have been made.
Figure 7:
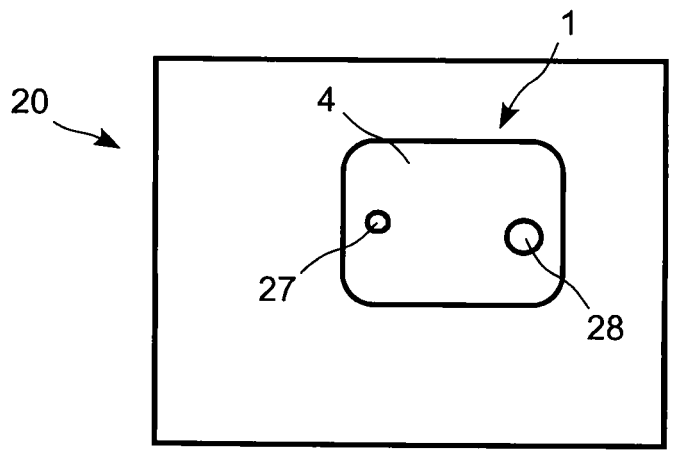
FIG. 7 is a plan view showing a portion of the card body and an electronic module that are assembled together after two through holes have been made.

In accordance with the invention, one or more through holes of small diameter, such as the through holes referenced 27 and 28 in FIGS. 5 to 7, are made after the module 1 has been secured to the card body 21. They are situated in a portion of the module 1 that presents a thickness that is less than the thickness of the card body 21, this portion here being a peripheral region of the top portion 19 in the example shown in the figures, i.e. a peripheral region of the contact area 4.

Each hole thus has a portion passing through a peripheral region of the contact area 4, and a portion passing through the card body 21 in a region corresponding to the cavity 22, and is a through hole so as to pass light.

Given the functional clearances specified between the module 1 and the cavity 22, there remains uncertainty as to the positioning of the module 1 relative to the cavity 22, such that the fact that such a hole allows light to pass through means that the hole was very probably made after the module 1 and the card body 21 had been assembled together.

In other words, these holes constitute an authentic physical link between the card body 21 and the module 1. The fact that a hole passes light means that it was very probably made by the card manufacturer, thereby guaranteeing that the module 1 is indeed the module that was initially paired with the card body 21.

When a fraudster fastens a pirate module in an existing card body 21, then assembling the pirate module and the card body 21 gives rise to an offset between the portion of the hole in the pirate module relative to the portion of the hole in the card body 21, such that light can no longer pass through it.

The sensitivity of this technique to that fraud is particularly large when the diameter of the through holes is selected to be small, thus making it possible to detect a positioning offset that is correspondingly small.

These holes are advantageously made by laser perforation, giving them a frustoconical type flared shape, as can be seen in the section view of FIG. 6, with the diameters of these holes lying in the range fifty micrometers to three hundred micrometers.

Each hole presents a smaller dimension section situated in the face of the card from which the hole was made, i.e. in the face of the card against which the laser was applied to make the hole.

In order to take advantage of this frustoconical shape, a first series of holes such as the hole 27 is made from the bottom face 29 and another series of holes such as the hole 28 is made from the top face 23 of the card body 21.

Each hole of the first series, such as the hole 27, has its smaller dimension section situated in the top face 23. With this technique, a fraudster implanting a pirate module in an authentic card body will find it very difficult if not impossible to make a hole portion in the module that is in alignment with an existing hole portion in the authentic card body.

In analogous manner, each hole in the second series, such as the hole 28, has its smaller dimension section situated in the bottom face 29. It is then almost impossible for a fraudster implanting an authentic module in a pirate card body to form a hole portion in the pirate card body that is in alignment with an existing hole portion in the authentic module.

These series of holes may be made up of holes that are in positions that have been selected randomly. However, the holes formed in this way advantageously make up patterns or symbols such as letters of the alphabet, as shown in the example of FIG. 8, or indeed numerals.

Under such circumstances, a first series of holes referenced 31 and made from the bottom face 29 defines five patterns referenced 32 to 36 and a second series of holes referenced 38 is made from the top face 23 and defines five other patterns referenced 39 to 43.

Advantageously, one of the series of patterns corresponds to the card manufacturer whereas the other series of patterns corresponds to the card itself, e.g. representing information that is also written on a face of the card body.

Figure 8:
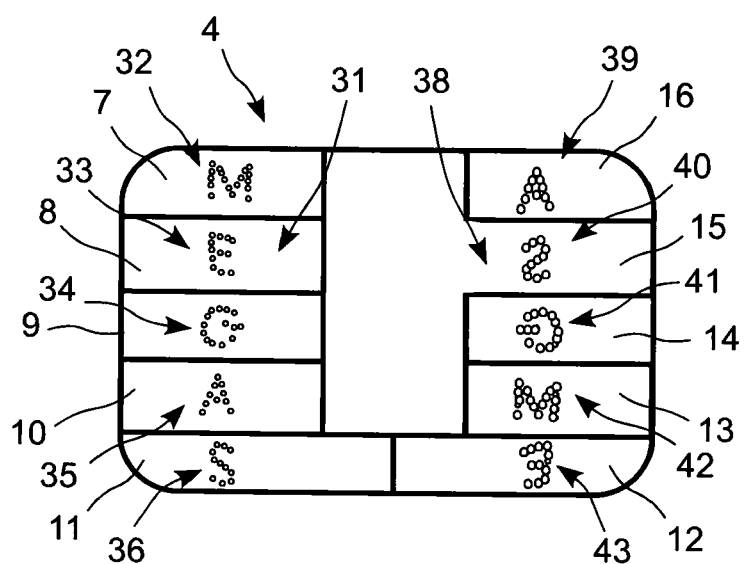
FIG. 8 is a plan view showing an electronic module assembled to a card body and in which a series of through holes have been made.

In the example of FIG. 8, each pattern is formed by a set of holes, all of which are made in the same electrical contact. This thus makes it possible to write in readable manner a pattern or a symbol on each of the contacts, thereby making reading easier.

A trader can thus verify the authenticity of the smart card merely by visual inspection. All that needs to be done is verify that the holes as formed in this way allow light to pass through, i.e., for example, that the symbols formed by these holes are visible when the card is placed in front of a light source.

Advantageously, the symbols formed by the series of holes are also stored in the electronic module 1, thus making it possible to perform an additional inspection, by verifying in the card reader that the image obtained by the reader illuminating the perforated zone does indeed correspond to the image recorded in the chip.

What is claimed is:
1. A smart card comprising:
a plastic card body having a cavity;

an electronic module housed in the cavity and secured thereto, the electronic module having:
- a metallic electrical contact area comprising a metallic peripheral region having a thickness that is less than the thickness of the card body, and
- a unit including a processor associated with a memory, the unit being fitted to a central region of one of the faces of the metallic electrical contact area, and
- a plurality of through holes each including a portion passing through the metallic peripheral region of the module, and a portion that passes through the card body;
- the plurality of through holes together defining one or more patterns.

2. A smart card according to claim 1, including at least one of a first series of patterns relating to the manufacturer of the smart card and a second series of patterns specific to the particular smart card.

3. A smart card according to claim 1, wherein each hole has a flared shape presenting a section of dimensions that increases from one end of the hole to the other.

4. A smart card according to claim 3, including at least one flared hole of smaller-dimension section situated in a first face of the card, and at least one other flared hole having its smaller-dimension section situated in a second face of the card, said second face being opposite from the first face.

5. A smart card according to claim 1, wherein each hole is made by laser perforation.

* * * * *